May 3, 1949.	H. ROSENBLOOM	2,469,079
MACHINE TOOL SUPPORT

Filed Feb. 7, 1946	4 Sheets-Sheet 1

INVENTOR.
Harry Rosenbloom
BY
Barnes, Kisselle, Laughlin & Raisch
ATTORNEYS

May 3, 1949.     H. ROSENBLOOM     2,469,079
MACHINE TOOL SUPPORT
Filed Feb. 7, 1946     4 Sheets-Sheet 3
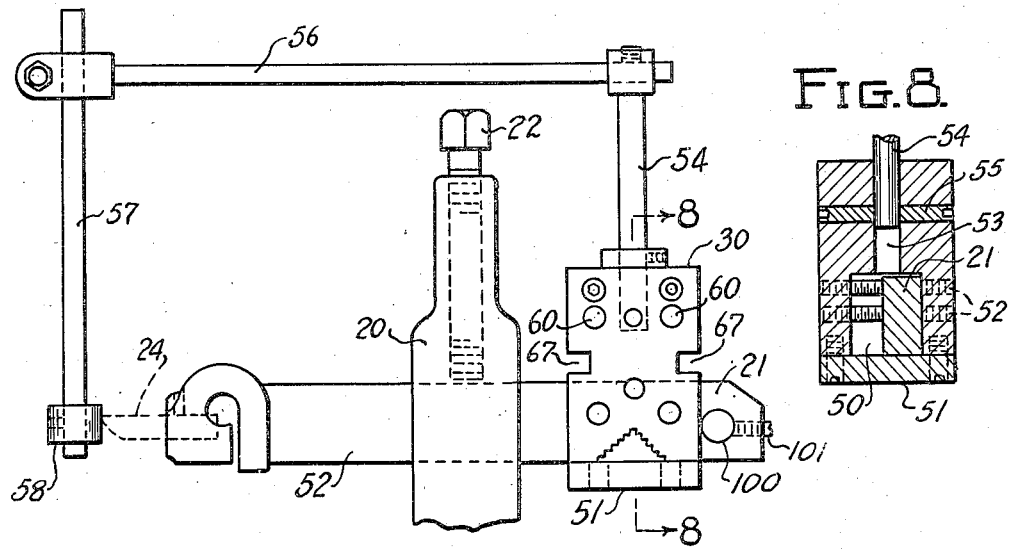
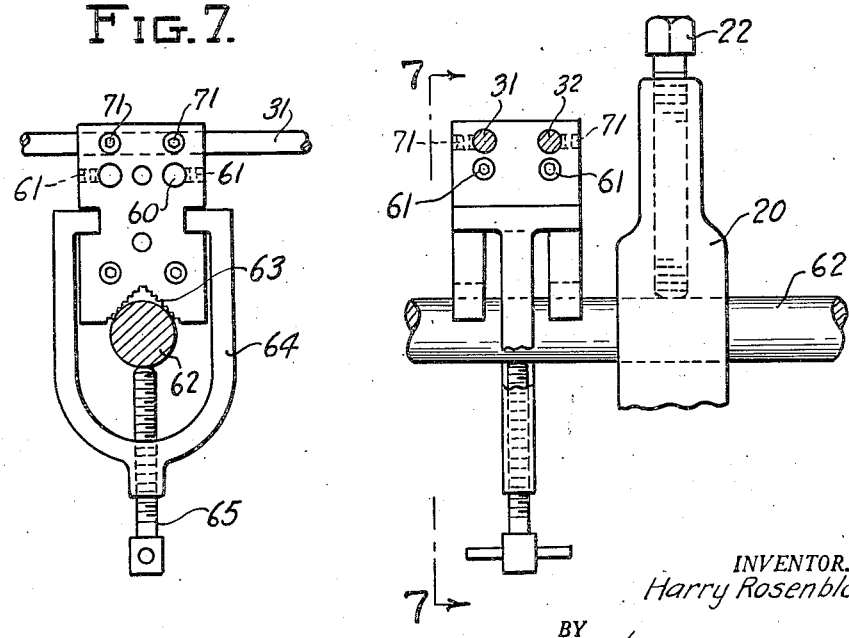
INVENTOR.
Harry Rosenbloom
BY
ATTORNEYS May 3, 1949. H. ROSENBLOOM 2,469,079
MACHINE TOOL SUPPORT
Filed Feb. 7, 1946 4 Sheets-Sheet 4

INVENTOR.
Harry Rosenbloom
BY
Barnes, Kisselle, Laughlin and Raisor
ATTORNEYS

Patented May 3, 1949

2,469,079

UNITED STATES PATENT OFFICE 2,469,079

MACHINE TOOL SUPPORT

Harry Rosenbloom, Detroit, Mich.

Application February 7, 1946, Serial No. 646,180

2 Claims. (Cl. 248—226)

This invention relates to apparatus for use with machine tools such, for example, as a lathe.

The general objects of the invention are to provide for the performing of work on work pieces so that the work can be done expeditiously and cheaper and so that in many instances precision work may be turned out by operators of lower skill than that heretofore required. Generally speaking, the apparatus provides improved and novel means whereby a cutting tool which acts upon the work piece may be moved in the fashion of a follower. To this end a scribe or suitable feeler is employed which may be causd to traverse a line, groove or surface so that the cutting tool moves in the same path relative to the work. In accordance with the invention, the guiding instrumentality may be a drawing, a scribing groove or the surface of a master guide, such as a sine bar or an element having the predetermined shape or radius. To this end, an arrangement is provided whereby various elements, such as button-like devices may be used to provide different radii of curvature. An improved holding device is provided which may be fastened to and carried by the tool holder, and which is so constructed and arranged it may be applied for holding the supporting arms of the guiding mechanism in different manners and so that it may be attached to a boring bar. The invention and other objects will be better appreciated as the following detailed description is considered in conjunction with the accompanying drawings:

Fig. 5 is a detailed view illustrating the supporting block.

Fig. 6 is a view of the block arranged and mounted on a boring bar.

Fig. 7 is a view taken substantially on line 7—7 of Fig. 6.

Fig. 8 is a sectional view taken through the block on line 8—8 of Fig. 5.

Figure 1:
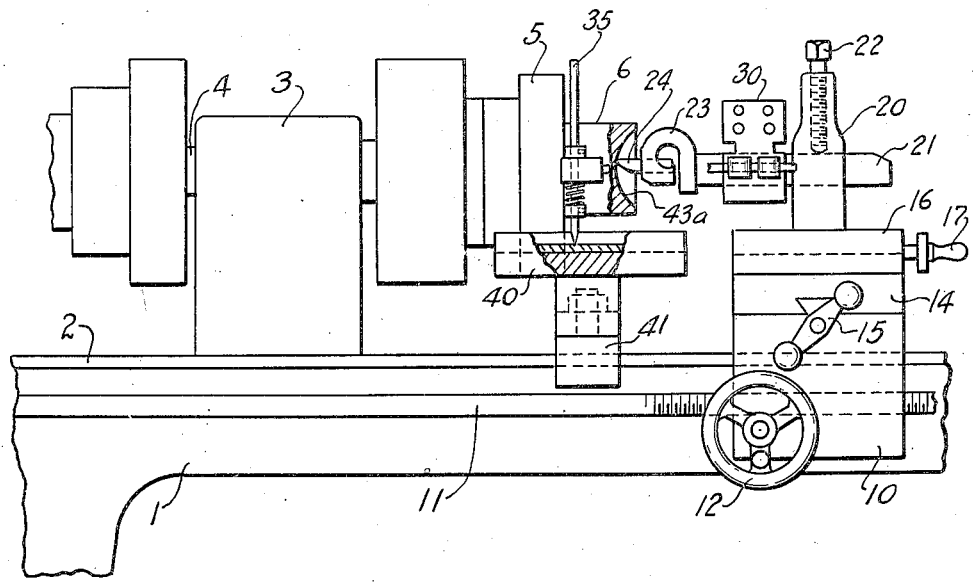
Fig. 1 is a side elevational view with parts in section showing the invention applied to a lathe.

The machine illustrated is a lathe having the usual construction with a base or frame 1 with a guideway 2, a support 3 for a shaft 4, which may be rotated by any suitable means and which carries a chuck 5 for receiving and holding a suitable work piece 6. Mounted upon the guide is a carriage 10 so that it may be reciprocated along the guide as by means of a screw 11, which reciprocation may be either automatic or hand operated as by means of a hand wheel 12. Mounted upon the carriage 10 is another carriage 14 which may be reciprocated relative to the carriage 10 in a direction at right angles to the guides 2 as by means of a suitable handle 15. The machine may also include a supporting carrier 16 which may be revolved on the carriage 14 as by means by operating a handle 17. The means for reciprocating the carriage 14 and revolving the support 16 are not described as these are known to those versed in the art.

A bolster 20 is carried by the support 16 and this is arranged to receive the usual tool holder 21 which may be clamped in position by a screw 22 and this bolster may be provided with a vibration dampening yieldable element 23 which directly supports and carries the operating tool 24.

Figure 2:
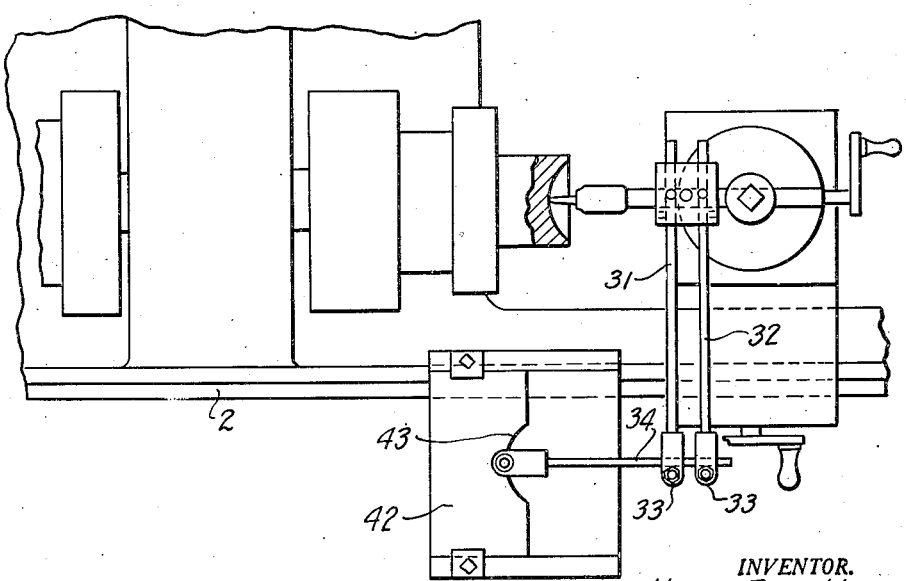
Fig. 2 is a top plan view of the structure shown in Fig. 1.
Figure 10:
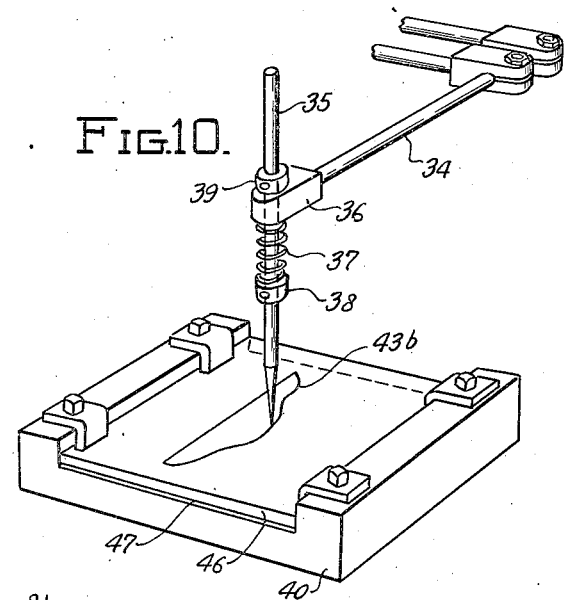
Fig. 10 is a detailed view illustrating a scribing tool.

There is a block 30, later to be described in detail, arranged to be mounted upon the tool holder 21 and, as shown in Fig. 2, this block is arranged to receive and hold a pair of arms 31 and 32, which preferably project toward the operator. Each arm has a clamp device 33 for receiving and clamping in an adjustable manner another arm 34. The arm 34 carries a suitable guiding instrumentality as shown in Fig. 1 as being in the form of a scribe or stylus. This scribe, as illustrated in Figs. 1 and 10, and as shown at 35, is preferably slidably mounted in an end piece 36 of the arm 34 so that it is yieldable. To this end, there is a coil spring 37 which surrounds the scribe and positioned between the end piece 36 and a collar 38 on the scribe to thus normally hold a collar 39 seated against the end piece 36.

As illustrated in Fig. 1, a plate 40 is mounted upon the guide portion 2 of the lathe by the means of a suitable clamping bracket 41 and upon the surface of this plate is mounted a suitable master form to be followed by the scribe, the following end of which may be pointed as illustrated. As illustrated in Figs. 1 and 2, the tool is performing an operation upon the work piece which forms an internal or concaved recess in the work and for such an operation the master form piece 42 may be suitably clamped to the plate 40 and provided with the curved formation 43. In the performance of the work, the operator may manipulate the handle 12 and the handle 15 to cause the scribe to traverse the surface 43 and thereby cause the tool 24 to follow the same path and cut the work piece along the line 43a as shown in Fig. 1. As illustrated in Figs. 1 and 2 the piece 42 may be a sheet of metal with the master form 43 merely in the shape of a groove or line notched into the surface thereof to be followed by the pointed stylus. A suitable drawing or print may be employed so that the stylus may be moved along the lines thereof. It is also within the invention to cover the drawing or blue print with a transparent sheet of material, such as glass or plastic so that the stylus flows along the surface of the glass or plastic in a path following the line visible therethrough. In Fig. 10 is shown a sheet of glass or plastic or other transparent material 46 positioned over an element such as a drawing, print or sheet of metal 47 bearing on its surface the outline 43b which the stylus is to follow. Preferably the transparent sheet is made as thin as feasible.

The block is shown in detail in Figs. 5 to 8 inclusive, and it is arranged so that it is particularly versatile and can be employed in many different situations. Fig. 5 shows how the block may be mounted on the opposite side of the bolster from the tool, and this mounting may be preferable in some cases as it gives a stronger more rigid mounting. The tool holder in Fig. 5 is provided with a hole 100 with a set screw 101. The rod 32, or one of them, may be attached to the tool holder by means of this hole. This construction may be preferable in some cases. It has a passage or notch therethrough, as shown at 50, closed by a plate 51 for the receiving of the tool holder 21 and it may be clamped to the tool holder by suitable screws 52. It is provided with a vertical aperture or recess 53 for receiving a bar 54 held by screws 55 where it is desired to hold the follower in a manner shown in Fig. 5. As illustrated in Fig. 5, the follower is held by additional rods 56 and 57 adjustably clamped together as illustrated and in this particular case the follower is in the form of a circular piece 58.

The block has a pair of apertures therein 60 for receiving the two supporting arms as illustrated at 31 and 32, the arms being adjustably mounted by set screws 61 (Fig. 7).

The block is arranged so that it may be attached to a boring bar where a boring bar form of tool holder is used. This is illustrated in Fig. 6 where a boring bar 62 is mounted in the bolster 20. To so mount the block, the cap plate 51 is removed and the block is provided with inverted V-shaped notches 63 for fitting on the boring bar and a clamp 64 holds the block in position by means of a screw 65. The clamp has fingers 66 which fit into recesses 67 formed in the block. The surfaces of the V-shaped recesses are preferably roughened or serrated as shown in order to grip the boring bar. When used on a boring bar it may be desirable to support the follower after the manner shown in Fig. 4 and the rods 31 and 32 may be passed through other apertures through the block as at 70, the rods being held adjustably in position by screws 71. Thus, it will be seen that the block may be used in different positions on a boring bar or a tool holder. In the sense of the claims appended hereto, both the boring bar 62 and the holder 21 are tool holders.

Figure 3:
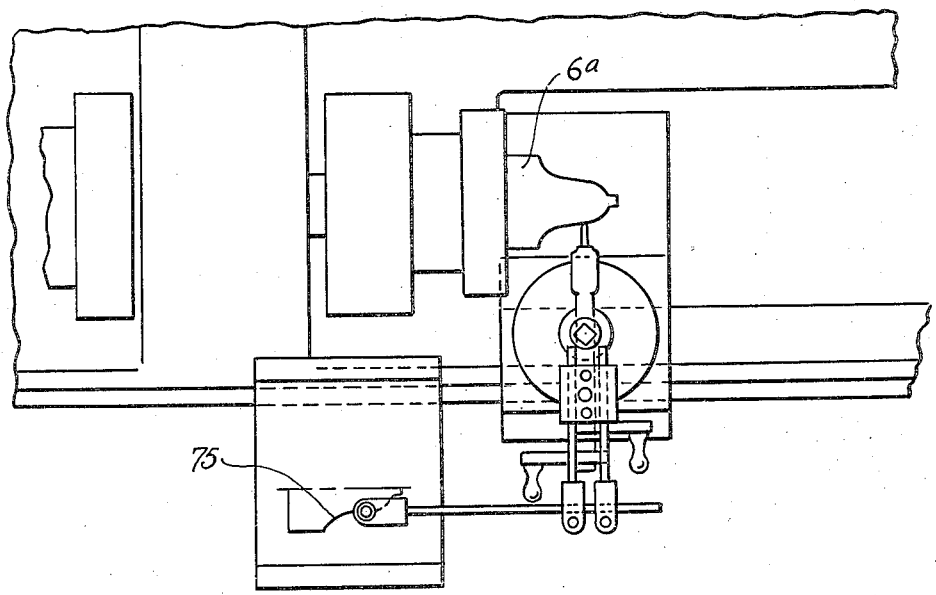
Fig. 3 is a view similar to Fig. 2 showing the performance of a different class of work.

The illustration in Fig. 3 shows how the mechanism may be set up to perform operations on the exterior of the work piece 6a. The stylus or follower is caused to traverse the scribed groove or line 75 so that the tool follows in the same path and cuts the work of the shape indicated.

Figure 4:
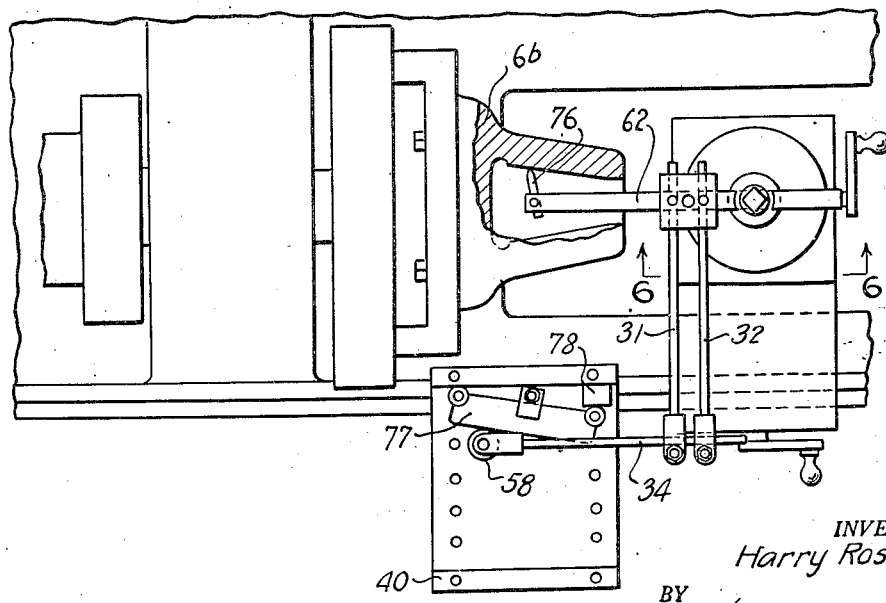
Fig. 4 is a view similar to Fig. 3 illustrating the device as used with a boring bar.

A boring bar installation is shown in Fig. 4 where the boring bar 62 has its tool 76 functioning on the work piece 6b. This figure also shows the use of a sine bar 77 clamped to the support 40 and positioned in the usual manner by the use of a precision block 78. In this case the follower may be in the nature of a circular piece or the like 58 as shown in Fig. 5.

Figure 9:
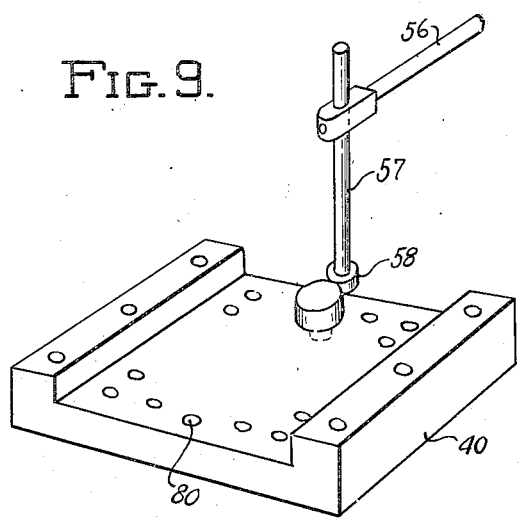
Fig. 9 is a perspective view illustrating the use of the apparatus with curvature providing buttons.
Figure 11:
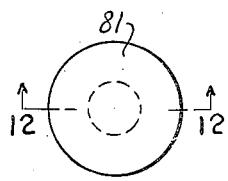
Fig. 11 is a plan view of a guide button.
Figure 12:
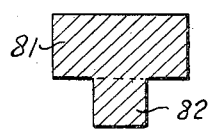
Fig. 12 is a sectional view taken substantially on line 12—12 of Fig. 11.

In order to quickly provide for the performing of work on different radii on work pieces the support 40 is preferably provided with a series of apertures or recesses 80 (Fig. 9) for the reception of elements which may be termed buttons. Such an element is shown in Figs. 11 and 12 having a head 81 and a stub 82. The head 81 is provided with the desired radii and any one of different sized buttons may be properly located in the support 40 so that it may be traversed by a suitable follower. As shown in Fig. 9 the follower is similar to the one illustrated in Fig. 5 and has the same reference characters applied thereto. The assembly may be applied to a milling machine as well as a lathe or other machine tool. In all cases the operator may watch the follower instead of the work, the same being easier to see and follow and in some work it is easier on the operator's eyes.

Figure 13:
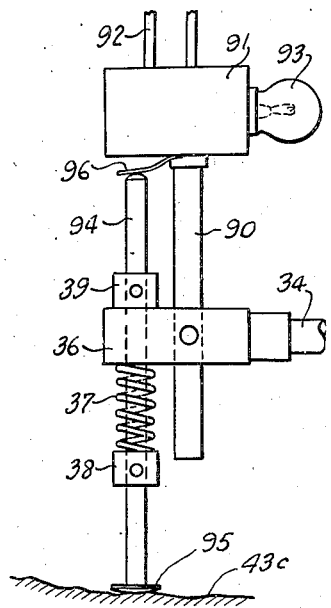
Fig. 13 is a view illustrating an electrical indicating arrangement.
Figure 14:
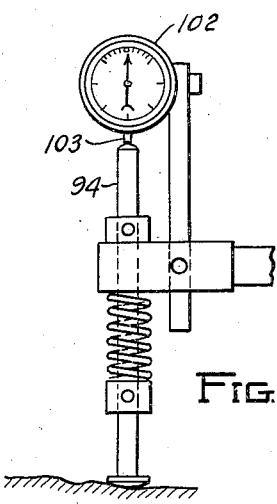
Fig. 14 is a view illustrating a dial gauge indicator.

As shown in Fig. 14, a dial gauge may be employed. The parts illustrated are the same as those illustrated in Fig. 13 with the same reference characters applied. However, instead of the switch 91 the dial gauge 102 is mounted on the post 90 and the follower 94 engages the dial finger 103. The job is preferably set up so that the gauge normally reads zero when the follower is applied to the work with proper pressure and the dial will give an indication if the pressure becomes so great as to unduly lift the follower 94 in its mounting.

An electrical indicating arrangement is shown in Fig. 13. Here the arm 34 is provided with an adjustable support 90 for receiving a sensitive electric switch 91 to which a suitable source of electric current is supplied through conductors 92 and which makes and breaks the circuit for an electric lamp as illustrated at 93. The follower rod 94 may have a head 95 for following the contour of the guide 43c and it is mounted the same as the stylus shown in Fig. 10 with the spring 37 and collars 38 and 39. The upper end of the follower is associated with the switch arm 96. If the follower head 95 presses too hard on the work the rod is shifted upwardly and actuates the switch and thereby energizes the lamp. This can be set up for certain classes of work and a shift of a very few thousandths of an inch of the rod 54 causes the lamp to be energized thus indicating that too much pressure is applied to the follower.

I claim:

1. A supporting block device adapted to be mounted upon a tool holder and a boring bar of a machine tool such as a lathe for in turn adjustably and rigidly supporting a guiding instrumentality for governing the relative movement between a work piece and a cutting tool comprising, a body, said body having a passage therethrough for fitting over a tool holder, set screws for clamping the body to the tool holder, said body having at least one aperture therethrough extending at right angles to the passage for the reception of a supporting arm, set screw means on the body for clamping said arm, a removable closure piece for the passage, said block, on opposite sides of the passage, having inverted substantially V-shaped notches, whereby the body may be turned through substantially right angles and mounted upon a boring bar and means formed in the body for receiving a clamp for engaging the boring bar on the opposite side of same from the inverted notches.

2. A supporting block device adapted to be mounted upon a tool holder and a boring bar of a machine tool such as a lathe for in turn adjustably and rigidly supporting a guiding instrumentality for governing the relative movement between a work piece and a cutting tool comprising, a body, said body having a passage therethrough for fitting over a tool holder, set screws for clamping the body to the tool holder, said body having at least one aperture therethrough extending at right angles to the passage for the reception of a supporting arm, set screw means on the body for clamping said arm, a removable closure piece for the passage, said block, on opposite sides of the passage, having inverted substantially V-shaped notches, whereby the body may be turned through substantially right angles and mounted upon a boring bar, means formed in the body for receiving a clamp for engaging the boring bar on the opposite side of same from the inverted notches, said block having an upwardly opening recess in its upper surface adapted to receive a supporting arm in a substantially vertical position and set screw means in the body for holding the supporting arm in said aperture.

HARRY ROSENBLOOM.

REFERENCES CITED

The following references are of record in the file of this patent:

UNITED STATES PATENTS

| Number | Name | Date |
|---|---|---|
| 268,301 | Smith | Nov. 28, 1882 |
| 1,705,629 | Wildbore | Mar. 19, 1929 |
| 1,851,004 | Donaldson | Mar. 29, 1932 |
| 1,928,373 | Flatter | Sept. 26, 1933 |
| 1,966,618 | Egorenkov | July 17, 1934 |
| 2,124,006 | Parker | July 19, 1938 |
| 2,302,506 | Richards | Nov. 17, 1942 |
| 2,344,849 | Butler-Jones | Mar. 21, 1944 |